US009162564B2

(12) United States Patent
Sakamoto et al.

(10) Patent No.: US 9,162,564 B2
(45) Date of Patent: Oct. 20, 2015

(54) FUEL TANK

(75) Inventors: Kazuhiro Sakamoto, Wako (JP);
Teruyuki Saitoh, Wako (JP); Yasunori Matsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1627 days.

(21) Appl. No.: 11/919,560

(22) PCT Filed: Jun. 23, 2006

(86) PCT No.: PCT/JP2006/312613
§ 371 (c)(1),
(2), (4) Date: Jan. 13, 2009

(87) PCT Pub. No.: WO2006/137524
PCT Pub. Date: Dec. 28, 2006

(65) Prior Publication Data
US 2009/0276991 A1 Nov. 12, 2009

(30) Foreign Application Priority Data

Jun. 23, 2005 (JP) ................................ 2005-183592
Jun. 23, 2005 (JP) ................................ 2005-183598

(51) Int. Cl.
B65D 6/00 (2006.01)
B65D 8/00 (2006.01)
B60K 15/03 (2006.01)
F02M 37/00 (2006.01)
F02M 37/22 (2006.01)

(52) U.S. Cl.
CPC ............ *B60K 15/03* (2013.01); *F02M 37/0076* (2013.01); *F02M 37/22* (2013.01); *Y10T 29/49808* (2015.01)

(58) Field of Classification Search
CPC . B60K 15/03504; B60K 15/03; B60K 15/073
USPC .............................. 220/4.14, 4.12, 562, 641
See application file for complete search history.

(56) References Cited

U.S. PATENT DOCUMENTS 3,038,632 A 6/1962 Brown et al.
4,089,283 A * 5/1978 Mertens et al. .................. 413/6
4,131,980 A * 1/1979 Zinnbauer ....................... 29/463

(Continued)

FOREIGN PATENT DOCUMENTS

EP 0901925 A2 3/1999
JP 57-22026 5/1982

(Continued)

*Primary Examiner* — Anthony Stashick
*Assistant Examiner* — Blaine Neway
(74) *Attorney, Agent, or Firm* — Rankin, Hill & Clark LLP

(57) ABSTRACT

A fuel tank comprises an upper-half tank body (7) and a lower-half tank body (8) which are made of bowl-shaped steel plates and which integrally include a flange (7*f*) and a flange (8*f*) in their peripheral edges, respectively, the flanges (7*f*, 8*f*) being superposed on and liquid-tightly connected to each other. The flanges (7*f*, 8*f*) are connected together by crimping into a roll shape to form an annular thick-walled connection (12), and an annular reinforcing rib (7*r*, 8*r*) leading to the connection (12) is formed at least in one of the upper-half and lower-half tank bodies (7, 8). Thus, it is possible to provide a fuel tank in which a sufficient strength can be imparted to portions around a flange connection, without particularly increasing the thickness of a steel plate.

4 Claims, 10 Drawing Sheets

(56) References Cited

U.S. PATENT DOCUMENTS

| | | | |
|---|---|---|---|
| 4,977,936 A * | 12/1990 | Thompson et al. | 141/312 |
| 5,167,340 A * | 12/1992 | Shaw | 220/295 |
| 5,344,038 A * | 9/1994 | Freeman et al. | 220/62.22 |
| 5,449,086 A * | 9/1995 | Harris | 220/288 |
| 6,382,172 B1 | 5/2002 | Kobayashi et al. | |
| 6,661,339 B2 * | 12/2003 | Muirhead | 340/505 |
| 6,802,430 B2 * | 10/2004 | Tomimura et al. | 220/562 |
| 2003/0116537 A1 | 6/2003 | Meyer et al. | |
| 2005/0109685 A1 * | 5/2005 | Fujita et al. | 210/172 |
| 2005/0121004 A1 * | 6/2005 | Yamada et al. | 123/519 |

FOREIGN PATENT DOCUMENTS

| | | |
|---|---|---|
| JP | 57-167230 | 10/1982 |
| JP | 10-141161 | 5/1998 |
| JP | 11-114466 A | 4/1999 |
| JP | 2002-248950 | 9/2002 |
| JP | 2003-49721 | 2/2003 |
| JP | 2004-210003 | 7/2004 |
| JP | 2005-155348 | 6/2005 |

* cited by examiner

FUEL TANK

CROSS-REFERENCE TO RELATED APPLICATION

This application is a National Stage entry of International Application No. PCT/JP2006/312613, filed Jun. 23, 2006, the entire specification claims and drawings of which are incorporated herewith by reference.

TECHNICAL FIELD

The present invention relates to improvement of a fuel tank comprising an upper-half tank body and a lower-half tank body which are made from bowl-shaped steel plates and which integrally include flanges in their peripheral edges which are superposed on and liquid-tightly connected to each other, and more particularly to an improvement of such a fuel tank suitable for a general-purpose engine mounted on a working machine.

BACKGROUND ART

In such a conventional fuel tank, welding (Patent Publication 1) or crimping has been employed to connect together the flanges of the upper-half tank body and a lower-half tank body. Patent Publication 1: Japanese Utility Model Publication No. 57-22026

DISCLOSURE OF THE INVENTION

Problems to be Solved by the Invention

A general-purpose engine sometimes comes into an overturned state and the like under severe use environment. In such a case, also a fuel tank needs to withstand a large impact force. Particularly, a flange connection between the upper-half and lower-half tank bodies needs to have a high strength so that fuel leakage does not occur. This requirement has been conventionally satisfied by increasing the thickness of a steel plate which is a material for forming a fuel tank. However, the increase in the thickness of the steel plate increases the weight of the fuel tank.

The present invention has been achieved in view of the above-mentioned circumstances, and has an object to provide a fuel tank in which a sufficient strength can be imparted to portions around a flange connection, without particularly increasing the thickness of a steel plate.

The present invention has another object to provide a fuel tank which can maintain for a long term the sealability of a sealing surface of a fuel supply port cylinder which is closed by a tank cap while keeping the good appearance of a tank ceiling portion, and which is excellent in productivity.

Means for Solving the Problems

In order to achieve the above object, according to a first feature of the present invention, there is provided a fuel tank comprising an upper-half tank body and a lower-half tank body which are made from bowl-shaped steel plates and which integrally include flanges in their peripheral edges, the flanges being superposed on and liquid-tightly connected to each other, characterized in that the flanges are connected together by crimping into a roll shape to form an annular thick-walled connection; and an annular reinforcing rib leading to the connection is formed at least in one of the upper-half and lower-half tank bodies.

According to a second feature of the present invention, in addition to the first feature, a pair of annular reinforcing ribs leading to opposite sides of the connection are formed in the upper-half and lower-half tank bodies.

According to a third feature of the present invention, there is provided a fuel tank comprising an upper-half tank body and a lower-half tank body which are made of bowl-shaped steel plates and which integrally include flanges in their peripheral edges, the flanges being superposed on and liquid-tightly connected to each other, characterized in that the flanges and another flange which is formed in a peripheral edge portion of a bowl-shaped bottom supporting plate arranged to cover a bottom surface of the lower-half tank body, are connected together by crimping into a roll shape to form an annular thick-walled connection; the annular reinforcing ribs leading to the connection are formed in the upper-half tank body, the lower-half tank body, and the bottom supporting plate; and the bottom supporting plate is provided with a mounting portion for mounting the bottom supporting plate to an engine.

The mounting portion correspond to bolts 19 and nuts 21 in an embodiment of the present invention, which will be described later.

According to a fourth feature of the present invention, in addition to any of the first to third features, at least the upper-half tank body comprises a painted steel plate made by pre-baking a paint film on a surface of a steel plate.

According to a fifth feature of the present invention, there is provided a fuel tank comprising: a tank ceiling portion; a fuel supply port cylinder which is connected to the tank ceiling portion so as to pass therethrough and which is closed by a tank cap; an annular sealing surface being formed on an upper end surface of the fuel supply port cylinder, and a gasket of the tank cap coming into close contact with the annular sealing surface, characterized in that at least an upper-half tank body constituting an upper part of the tank comprises a painted steel plate having a prepainted surface; and the fuel supply port cylinder comprising a unpainted steel plate is connected to the upper-half tank body.

According to a sixth feature of the present invention, in addition to the fifth feature, the upper-half tank body and the fuel supply port cylinder are connected together by crimping so that an upper part of the fuel supply port cylinder is exposed; and a surface of the exposed upper part of the fuel supply port cylinder comprises the sealing surface.

According to a seventh feature of the present invention, in addition to the fifth or sixth feature, the sealing surface is formed into a funnel shape.

According to an eighth feature of the present invention, in addition to the sixth or seventh feature, the fuel supply port cylinder is made from a plated steel plate.

Effect of the Invention

With the first feature of the present invention, the two flanges of the upper-half and lower-half tank bodies are connected by crimping into a roll shape, thereby forming the thick-walled connection having a high rigidity wall with a thickness sufficiently larger than a material for forming the fuel tank, and also effectively reinforcing the fuel tank by cooperation between the thick-walled connection and the annular ribs leading to one side of the thick-walled connection. Therefore, it is possible to increase the durability against an impact force in the lateral direction to the fuel tank without particularly increasing the thickness of the material plate forming the fuel tank, that is, it is possible to simultaneously achieve weight reduction and durability improvement.

With the second feature of the present invention, it is possible to further effectively reinforce the fuel tank by cooperation between the annular thick-walled connection and the pair of annular reinforcing ribs leading to opposite sides of the annular thick-walled connection.

With the third feature of the present invention, the two flanges of the upper-half tank body, the lower-half tank body and the bottom supporting plate are connected by crimping into a roll shape, thereby forming the thick-walled connection having a high rigidity wall with a thickness sufficiently larger than that of a material plate forming the fuel tank, and also effectively reinforcing the fuel tank by cooperation between the thick-walled connection and three lines of the annular ribs leading to the thick-walled connection. Therefore, it is possible to increase the durability against an impact force in the lateral direction to the fuel tank without particularly increasing the thickness of the material plate forming the fuel tank, that is, it is possible to simultaneously achieve weight reduction and durability improvement.

Also, because the bottom supporting plate is mounted to the engine, vibration of the engine is absorbed by the bottom supporting plate to suppress the transmission of the vibration to the upper-half and lower-half tank bodies.

With the fourth feature of the present invention, the upper-half tank body is made from a painted steel plate. Therefore, the exfoliation of the paint film on the upper-half tank body made from a painted steel plate does not occur, although the thick-walled connection is formed by crimping into a roll shape, thereby improving the good appearance of the fuel tank.

With the fifth feature of the present invention, the upper-half tank body is made from a painted steel plate, thereby improving the good appearance of the upper-half tank body. Also, the fuel supply port cylinder having a sealing surface and connected to the upper-half tank body is made from a unpainted steel plate, thereby marinating the sealing surface of the fuel supply port cylinder in good condition for a long term irrespective of an accidental exfoliation of the paint film on the surface of the upper-half tank body. Further, because troublesome steps such as painting and masking are unnecessary after the connection of the fuel supply port cylinder to the upper-half tank body, it is possible to improve productivity.

With the sixth feature of the present invention, the upper-half tank body made from a painted steel plate and the fuel supply port cylinder made from an unpainted steel plate are connected together by crimping. Therefore, unlike the case of connection by welding, there is no concern about the burnout of the paint film on the surface of the upper-half tank body and the thermal deformation of the sealing surface of the fuel supply port cylinder, and it is possible to effectively increase the rigidity of the sealing surface. Thus, it is possible to maintain the good appearance of the upper-half tank body, and simultaneously improve the durability of the sealing surface.

With the seventh feature of the present invention, when the fuel adheres to the sealing surface during the supply of the fuel to the fuel tank, it is possible to cause the fuel to flow naturally into the fuel tank along the funnel-shaped sealing surface, thereby preventing the stain by the fuel on the top surface of the fuel tank.

With the eighth feature of the present invention, the fuel supply port cylinder is made from a plated steel plate. Therefore, it is possible to connect the fuel supply port cylinder to the upper-half tank body by crimping without the exfoliation of the plating layer. At the same time, it is possible to maintain the sealing surface in good condition by the plating layer, and further improve the durability.

The above-mentioned objects, other objects, characteristics, and advantages of the present invention will become apparent from a preferred embodiment, which will be described in detail below by reference to the attached drawings.

EXPLANATION OF REFERENCE NUMERALS AND SYMBOLS

Figure 1:
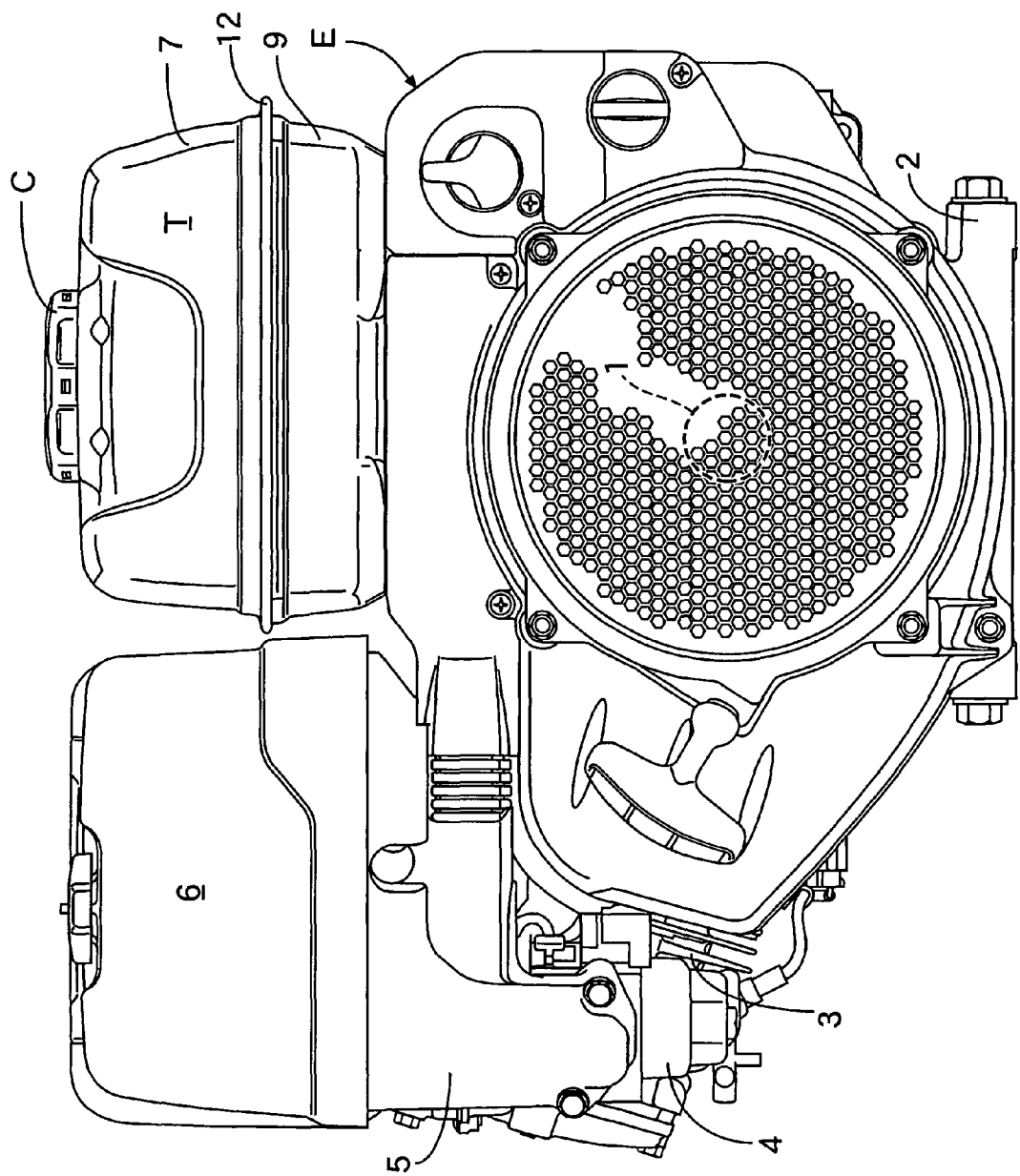
FIG. 1 is a front view of a general-purpose engine to which a fuel tank of the present invention is mounted. (first embodiment)

C tank cap
T fuel tank
7 upper-half tank body
7f flange
7r reinforcing rib
8 lower-half tank body
8f flange
8r reinforcing rib
9 bottom supporting plate
9f flange
9r reinforcing rib
38 fuel supply port cylinder
19, 21 mounting portion (bolt, nut)
39 sealing surface
48 gasket

BEST MODE FOR CARRYING OUT THE INVENTION

A preferred embodiment of the present invention is explained below with reference to the accompanying drawings.

Embodiment 1

In FIG. 1, the reference numeral E denotes a general-purpose four-cycle engine serving as a power source for various work machines. The engine E comprises a crank case 2 supporting a crankshaft 1 which is horizontally disposed, and a cylinder portion 3 which protrudes obliquely upward from the crank case 2. A fuel tank T is disposed immediately above the crank case 2 and supported thereby. A carburetor 4 is attached on one side of the cylinder portion 3. An air cleaner 6 is connected to the carburetor 4 via an intake duct 5, and is disposed immediately above the cylinder portion 3 so as to be positioned beside the fuel tank T.

Figure 2:
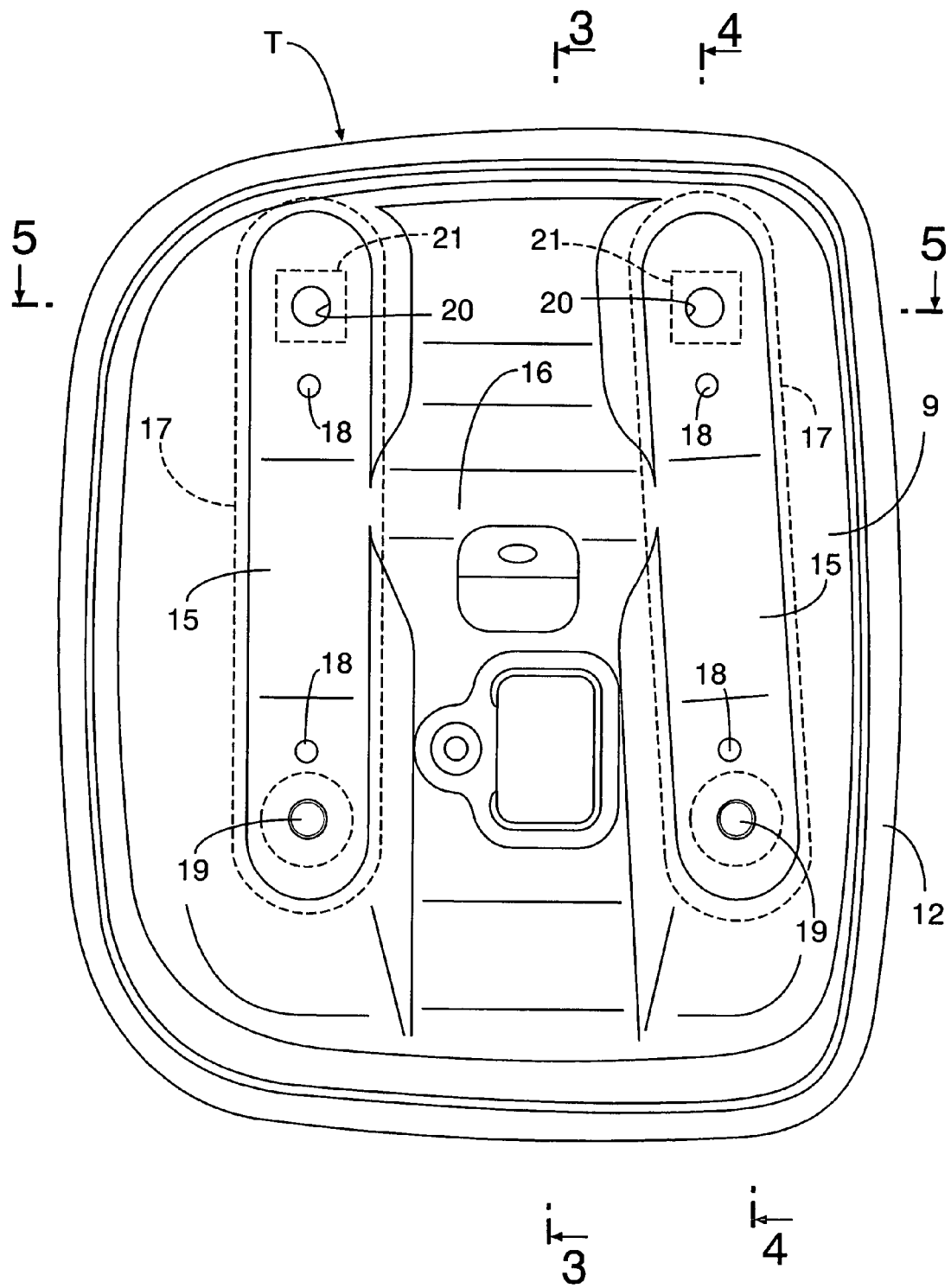
FIG. 2 is a bottom view of the fuel tank. (first embodiment)
Figure 3:
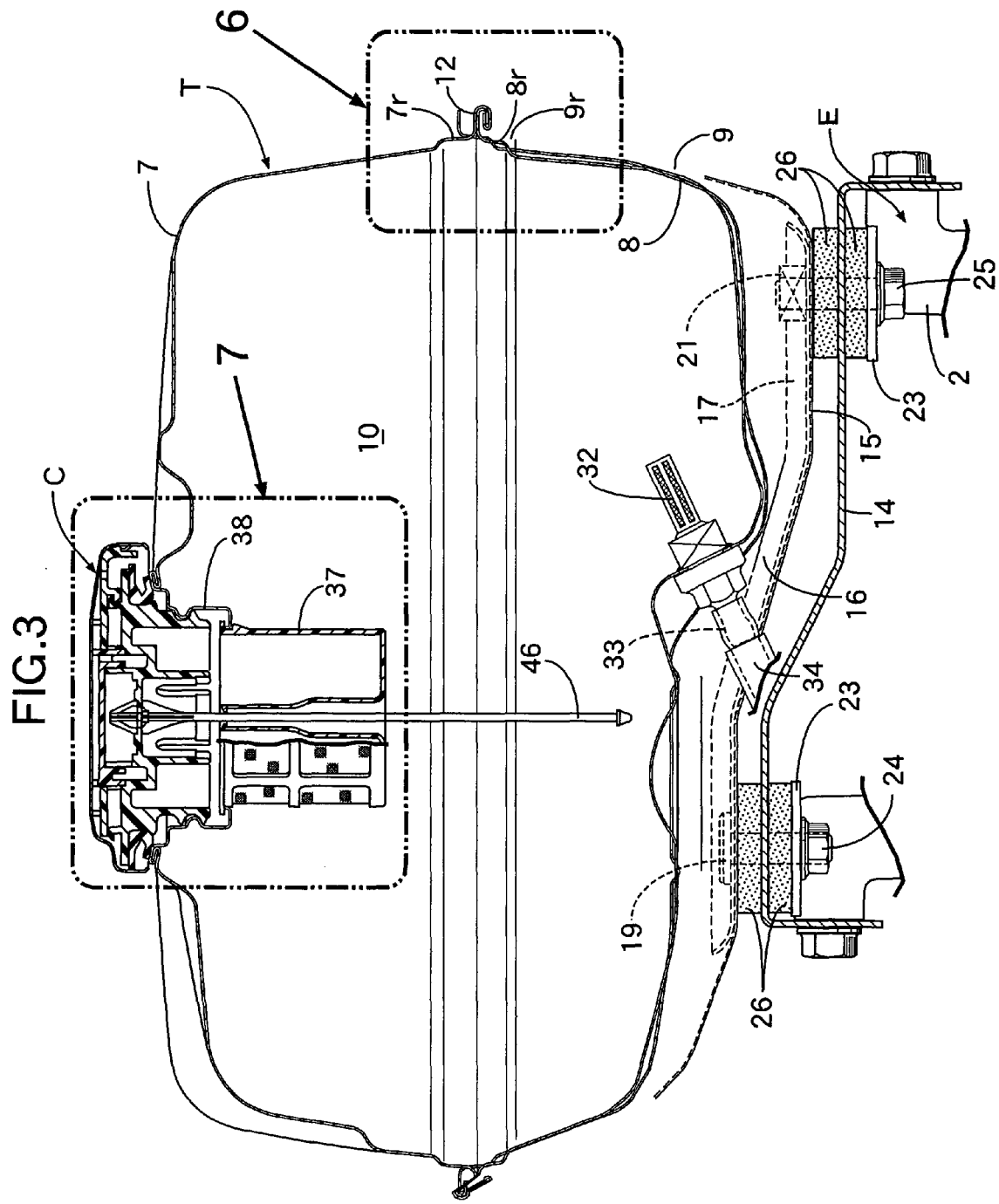
FIG. 3 is an enlarged sectional view taken on line 3-3 in FIG. 2. (first embodiment)
Figure 4:
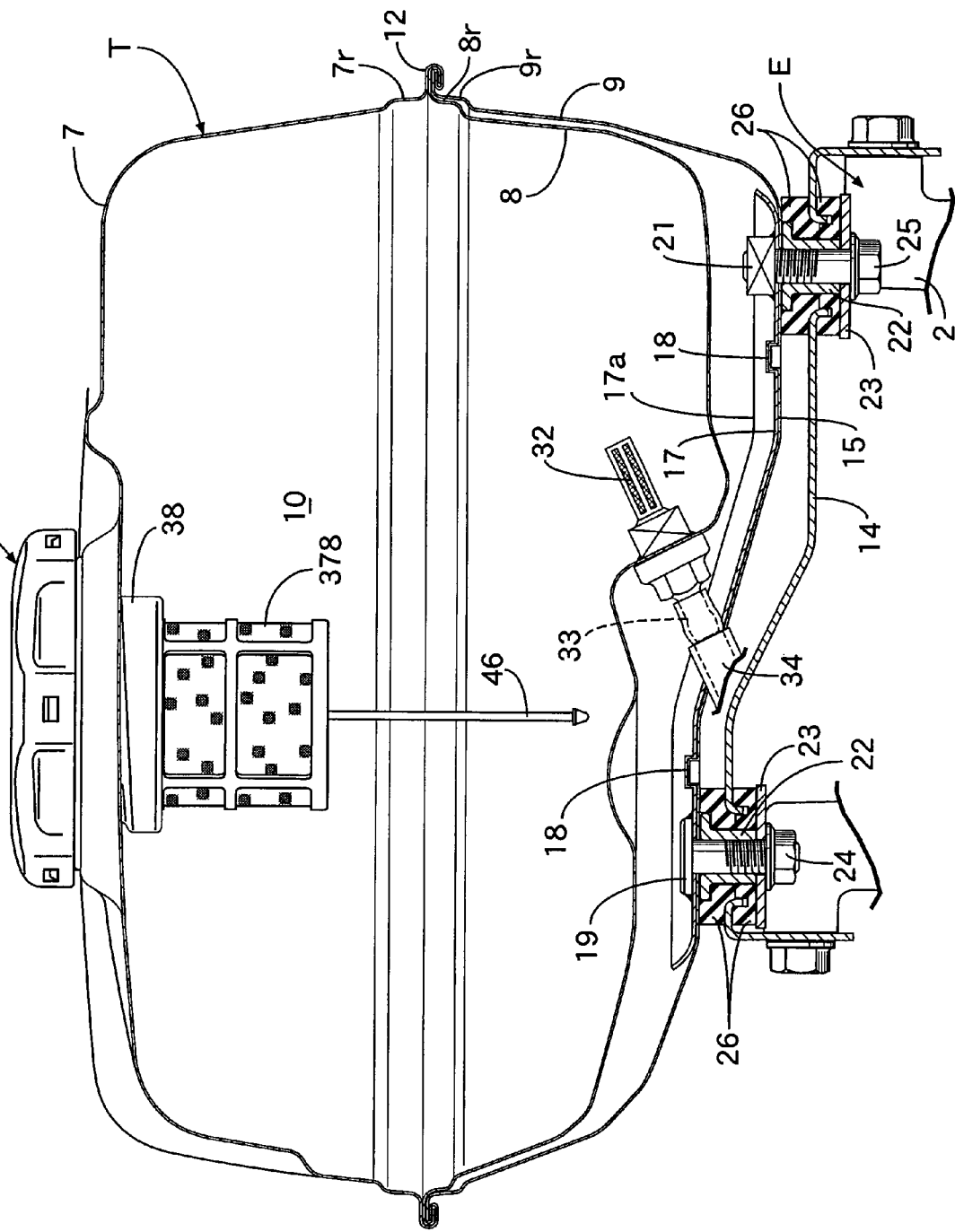
FIG. 4 is a sectional view taken on line 4-4 in FIG. 2. (first embodiment)
Figure 5:
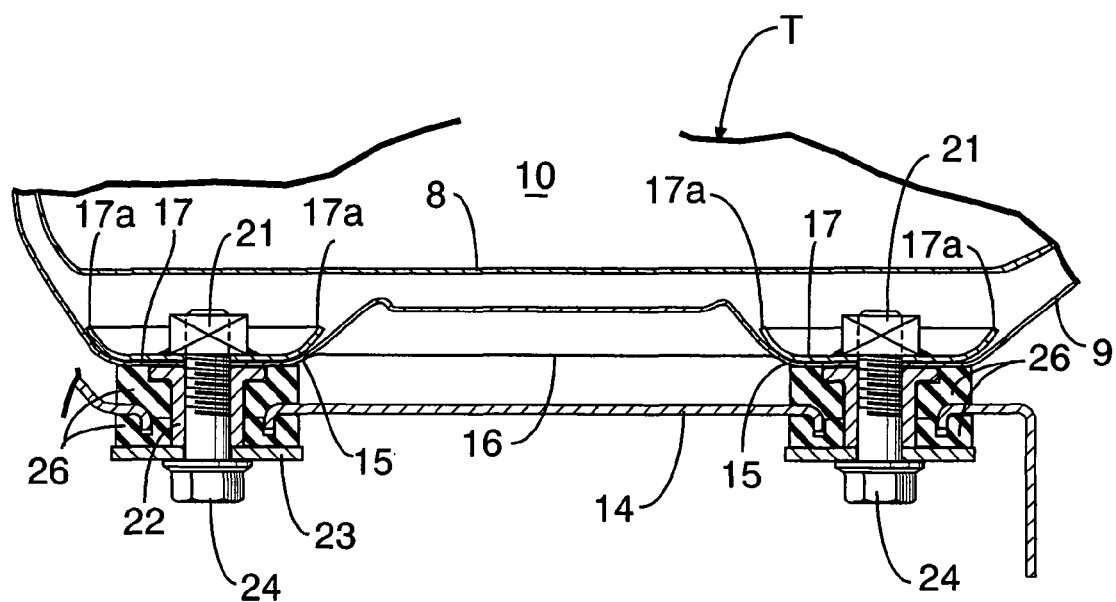
FIG. 5 is a sectional view taken on line 5-5 in FIG. 2. (first embodiment)
Figure 6:
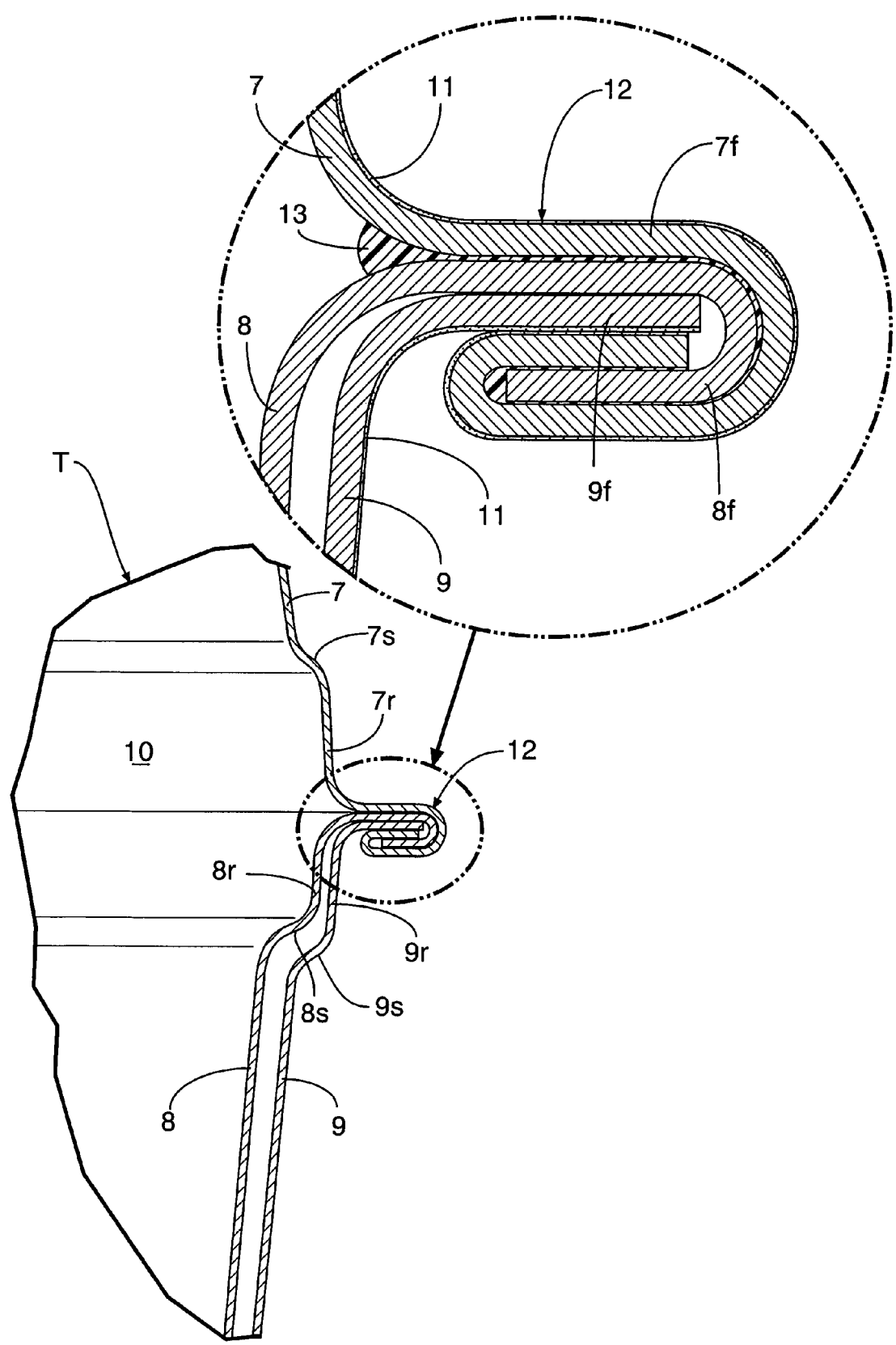
FIG. 6 is an enlarged view of part 6 in FIG. 3. (first embodiment)

As shown in FIGS. 2, 3 and 6, the fuel tank T comprises three members, i.e., an upper-half tank body 7 and a lower-half tank body 8 which are in the shape of a bowel and opposed to each other so as to define a fuel storage chamber 10, and a bowel-shaped bottom supporting plate 9 covering a bottom surface of the lower-half tank body 8 with a gap to the bottom surface. Among these members, the upper-half tank body 7 and the bottom supporting plate 9 which are exposed to the outside are made from a painted steel plate which is made by prebaking a paint film 11 on a surface of a steel plate, and the lower-half tank body 8 covered by the bottom supporting plate 9 is made from a general steel plate.

Flanges 7f, 8f, 9f are integrally formed in the peripheral edge portions of the upper-half and lower-half tank bodies 7 and 8, and the bottom supporting plate 9, respectively. These three flanges 7f, 8f, 9f are crimped into a roll shape to form an annular thick-walled connection 12 which has a wall thickness as large as several times the thickness of the material forming the fuel tank. In order to secure the liquid tightness of the connection 12 further reliably with respect to the fuel storage chamber 10, an adhesive 13 is applied at least to opposed surfaces of the upper two flanges 7f, 8f before the connection by crimping.

Annular reinforcing ribs 7r, 8r, 9r leading to the thick-walled connection 12 are bulgingly formed in the upper-half tank body 7, the lower-half tank body 8, and the bottom supporting plate 9. The height of each of the annular reinforcing ribs 7r, 8r, 9r is defined by annular steps 7s, 8s, 9s rising from each outer surface of the upper-half tank body 7, the lower-half tank body 8, and the bottom supporting plate 9.

A fuel supply port cylinder 38 passing through a ceiling portion of the upper-half tank body 7 is connected to the ceiling portion by crimping into a roll shape, and a tank cap C is attached by screwing to the upper-half tank body. An outlet pipe 33 having a fuel filter 32 is fixedly mounted on a bottom of the lower-half tank body 8. A fuel conduit 34 is connected to the outlet pipe 33 so as to pass through the bottom supporting plate 9 and guide the fuel to the carburetor 4.

The bottom supporting plate 9 is elastically attached to a bracket 14 which is fixedly mounted to an upper part of the crankcase 2. That is, as shown in FIGS. 2 to 5, the bottom of the bottom supporting plate 9 has a generally rectangular shape which is long in the forward/rearward direction of the engine E. A pair of longitudinal ribs 15, 15 and a lateral rib 16 are formed on the bottom of the bottom supporting plate 9. The longitudinal ribs 15, 15 bulgingly extend in the forward/rearward direction of the engine E in the vicinity along right and left longer-side portions of the bottom of the bottom supporting plate 9. The lateral rib 16 bulges so as to connect together middle portions of the longitudinal ribs 15, 15. On the rear side of each of the longitudinal ribs 15, 15, reinforcing plates 17, 17 are joined to the bottom supporting plate 9 by multiple press joints 18 so that the ribs 15, 15 extend in the same direction as the longitudinal rib 16 while their peripheral edge portions 17a, 17a rises into a rib shape.

Fixedly mounted by welding or the like to opposite ends of each of the reinforcing plates 17 are a bolt 19 passing through the bottom supporting plate 9 to project downward, and a nut 21 facing a bolt hole 20 which is bored in the reinforcing plate 17 and the bottom supporting plate 9.

The fuel tank T is formed so that the amount of overhang of the fuel tank T from the bolt 19 is larger than the amount of overhang of the fuel tank T from the nut 21. In this case, in order to position the center of gravity of the fuel tank T in a region surrounded by the two pairs of bolts and nuts 19, 21 and 19, 21, the bottoms of the lower-half tank body 8 and the bottom supporting plate 9 are formed in a stepped manner so that the side of the bolts 19 is higher than the side of the nuts 21.

When the fuel tank T is mounted on the bracket 14, a collar 22 disposed by being passed through the bracket 14 and a flat washer 23 opposed to the bottom surface of the bracket 14 are fixedly mounted by the nut 21 to each of the bolts 19. Further, the collar 22 disposed by being passed through the bracket 14 and the flat washer 23 opposed to the bottom surface of the bracket 14 are fixedly mounted by the bolt 25 to the nut 21. At the same time, in a portion around each of the collars 22, elastic supporting members 26, 26 are interposed between the bottom supporting plate 9 and the bracket 14 and between the bracket 14 and the flat washer 23.

The operation of the fuel tank T having the above construction will be described below.

In the production of the fuel tank T, the three flanges 7f, 8f, 9f of the upper-half tank body 7, the lower-half tank body 8, and the bottom supporting plate 9 are crimped into a roll shape, thereby forming the annular thick-walled connection 12 having a wall thickness as large as several times the thickness of the material forming the fuel tank. Therefore, the thick-walled connection 12 has a very high rigidity. Also, the annular reinforcing ribs 7r, 8r, 9r leading the thick-walled connection 12 are formed in the upper-half tank body 7, the lower-half tank body 8, and the bottom supporting plate 9, and the portion around the thick-walled connection 12 is greatly reinforced by these annular reinforcing ribs, thereby effectively reinforcing the fuel tank T. Therefore, even when the fuel tank T receive a large lateral impact force when the engine E is overturned, the fuel tank T can sufficiently withstand the lateral impact force, and it is unnecessary to particularly increase the wall thickness of the upper-half tank body 7, the lower-half tank body 8, and the bottom supporting plate 9. Thus, it is possible to simultaneously achieve weight reduction and durability improvement.

Because the upper-half tank body 7 and the bottom supporting plate 9 which are exposed to the outside are made from a painted steel plate, the exfoliation of a paint film on the painted steel plate does not occur although the thick-walled connection 12 is formed by crimping into a roll shape, thereby improving the good appearance of the fuel tank T.

Because the bottom supporting plate 9 is elastically supported by the bracket 14 which is fixedly mounted to the engine E via the elastic supporting members 26, 26, it is possible not only to absorb vibration during the operation of the engine E by the elastic supporting members 26, 26, but also to absorb vibration by the bottom supporting plate 9. Therefore, it is possible to suppress the transmission of vibration to the upper-half and lower-half tank bodies 7, 8, thereby preventing the generation of vibration and noise of the fuel tank T, and also improve the durability of the fuel tank T against vibration.

In addition, the rigidity of the bottom supporting plate 9 is effectively increased over a wide range by the pair of longitudinal ribs 15, 15 which are spaced apart from each other and extend substantially parallel, and the lateral ribs 16 which connects at least the middle portions of the longitudinal ribs 15, 15. Further, because the bolt 19 and the nut 21 are fixedly mounted to opposite ends of each of the longitudinal ribs 15, 15 so as to be connected via the elastic supporting members 26, 26 to the bracket 14, even when the vibratory load is transmitted from the elastic supporting member 26 to the bolt 19 and the nut 21 during the vibration of the engine, it is possible to prevent stress concentration by distributing the load over a wide range of the bottom supporting plate 9 via the longitudinal ribs 15, 15 and the lateral rib 16. Therefore, it is possible to improve the durability of the bottom supporting plate 9 against vibration without particularly increasing the thickness of the bottom supporting plate 9.

Further, because the pair of reinforcing plates 17, 17 is joined to the inner surface of the bottom supporting plate 9 so as to extend in a manner corresponding to the pair of longitudinal ribs 15, 15, and the bolt 19 and nut 21 are fixedly mounted to the reinforcing plates 17, 17, the reinforcing effect of the longitudinal ribs 15, 15 is enhanced by the reinforcing plates 17, 17 and the rigidity of the bottom supporting plate 9 is further increased. Furthermore, the bolt 19 and the nut 21 increase the strength of joining the reinforcing plates 17 to the bottom supporting plate 9, thereby contributing to an increase in the rigidity of the bottom supporting plate 9.

Moreover, the two pairs of the bolts and the nuts 19, 21 and 19, 21 are disposed so that the center of gravity of the fuel tank T situates in a region surrounded by these pairs of bolts and nuts, thereby ensuring that the weight of the fuel tank T and the vibratory load can be stably supported by the bracket 14 constantly via the two pairs of the bolts and the nuts 19, 21 and 19, 21.

Furthermore, the amount of overhang of the fuel tank T from the bolt 19 is set to be larger than the amount of overhang of the fuel tank T from the nut 21 and the bottoms of the lower-half tank body 8 and the bottom supporting plate 9 are formed in a stepped manner so that the side of the bolts 19 is higher than the side of the nuts 21. Therefore, even in the case where the fuel tank T is caused to overhang particularly greatly from the bolt 19 for the purpose of increasing the volume of the fuel tank T or for any design reason, it is possible to position the center of gravity of the fuel tank T in a region surrounded by the two pairs of the bolts and the nuts 19, 21 and 19, 21, thereby increasing the degree of freedom of design.

Next, the fuel supply port cylinder 38 and the tank cap C will be described below with reference to FIGS. 7 to 10.

Figure 7:
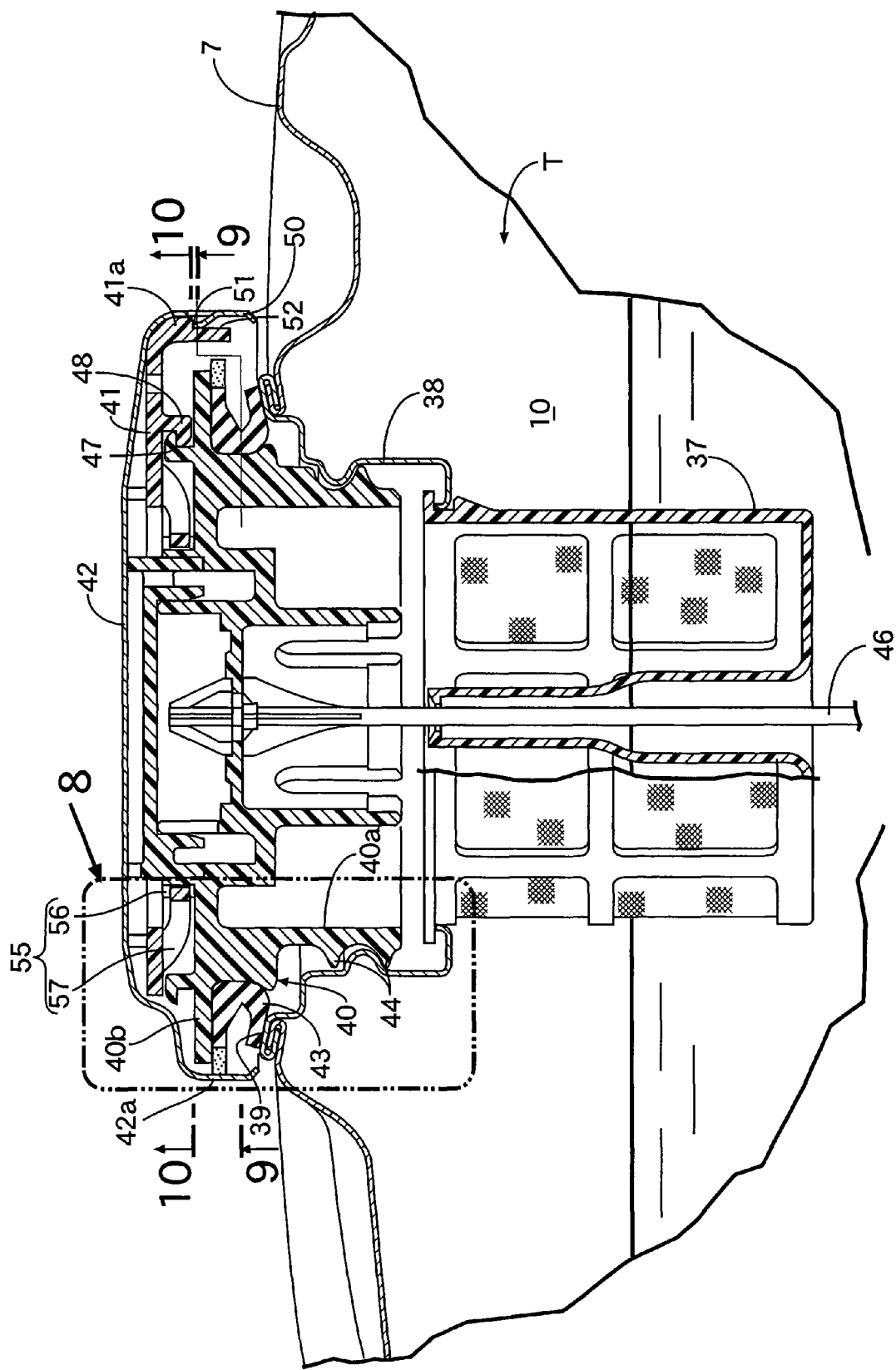
FIG. 7 is an enlarged view of part 7 in FIG. 3. (first embodiment)
Figure 8:
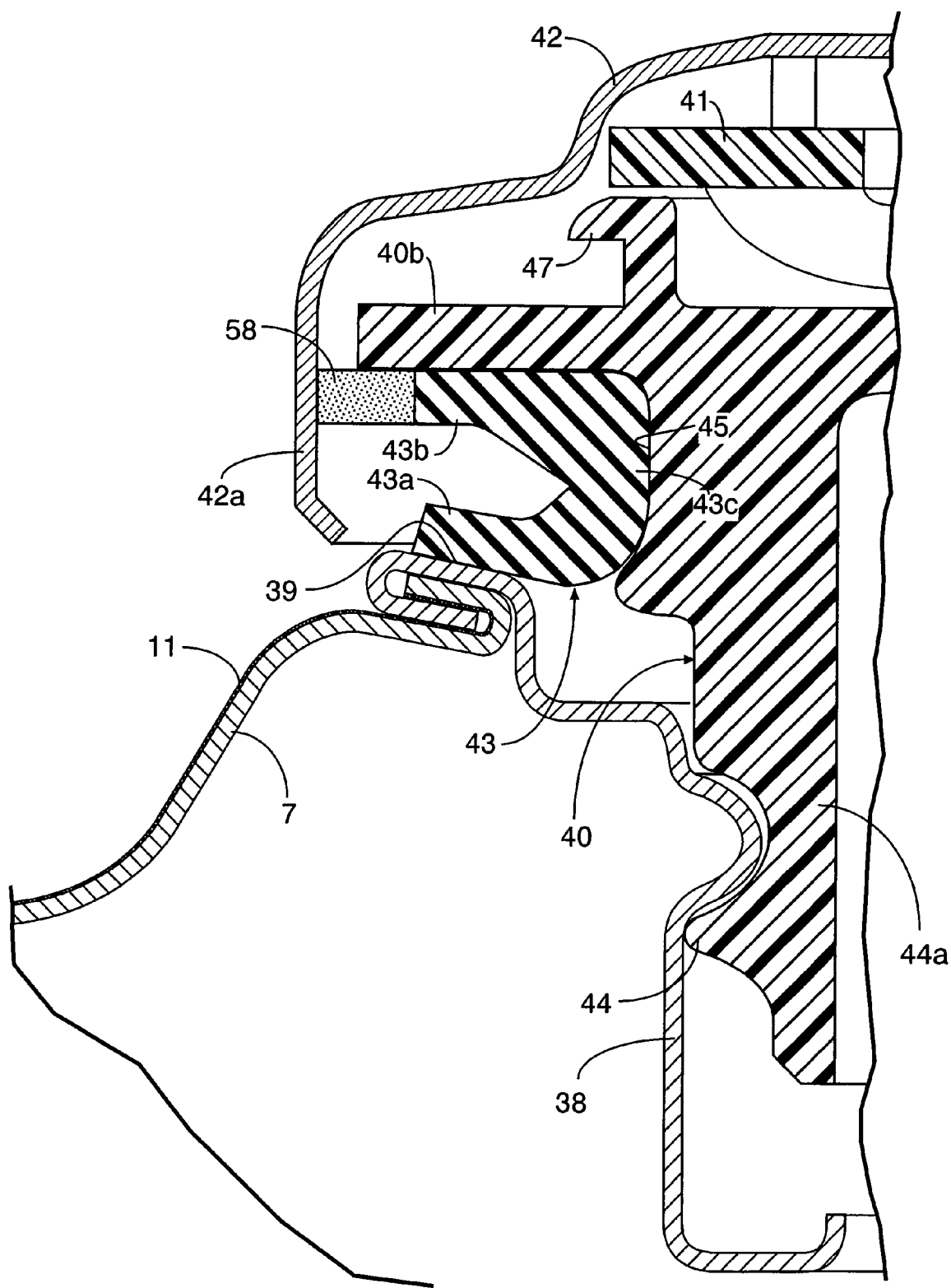
FIG. 8 is an enlarged view of part 8 in FIG. 7. (first embodiment)

As shown in FIGS. 7 and 8, an upper end portion of the fuel supply port cylinder 38 made from a plated steel plate (i.e., a unpainted steel plate) and passing through the central part of the upper-half tank body 7 is connected by crimping to the central part of the upper-half tank body 7 such that the upper end portion is exposed, and a funnel-shaped sealing surface 39 is formed in the exposed upper end portion of the fuel supply port cylinder 38. A fuel filter 37 for filtering the fuel poured into the fuel storage chamber 10 is connected to a lower end of the fuel supply port cylinder 38.

The tank cap C is attached to the fuel supply port cylinder 38. The tank cap C comprises main components as follows: a cap body 40 made of a synthetic resin; a cap inner part 41 likewise made of a synthetic resin; a cap shell 42 made of a steel plate; and a gasket 43.

The cap body 40 comprises: a cylindrical portion 40a with a ceiling, including on its periphery a threaded portion 44 capable of being screwed into the inner peripheral surface of the fuel supply port cylinder 38; and a flange 40b which overhangs radially from an upper end portion of the cylindrical portion 40a. An annular mounting groove 45 leading to a lower surface of the flange 40b is formed on an upper peripheral surface of the cylindrical portion 40a. The gasket 43 which comes into close contact with the sealing surface 39 is attached to the mounting groove 45. A teaser 46 (see FIGS. 3 and 7) for preventing the tank cap C removed from the fuel supply port cylinder 38 from dropping off is connected to the center of the ceiling portion of the cap shell 42.

Figure 9:
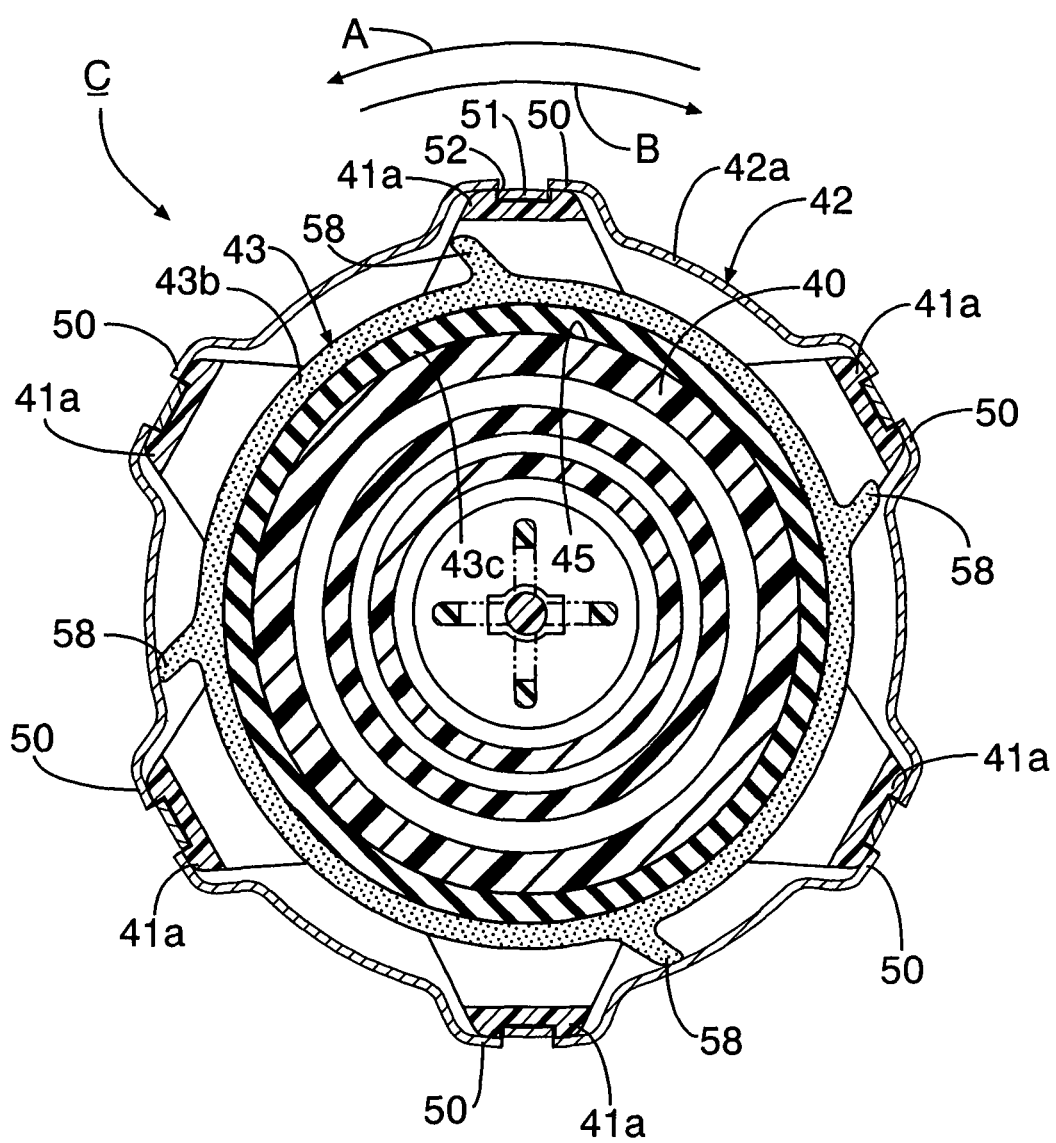
FIG. 9 is a sectional view taken on line 9-9 in FIG. 7. (first embodiment)

As shown in FIGS. 8 and 9, a cap inner part 41 is disposed immediately above the cap body 40. The cap inner part 41 and the cap body 40 are connected so as to be mutually rotatable by the engagement with an annular connecting hook-shaped portion 47 and annularly arranged multiple connecting claw portions 48. The annular connecting hook-shaped portion 47 and the multiple connecting claw portions 48 are formed on opposed surfaces of the cap inner part 41 and the cap body 40. The annular connecting hook-shaped portion 47 is disposed coaxially with the cap body 40. The cap inner part 41 includes multiple projections 41a which project from the periphery of the cap inner part 41 into a shape of a star, and which have leading end parts bent downward. The cylindrical cap shell 42 with a ceiling is fitted onto the periphery of the cap inner part 41. Multiple bulging portions 50 which receive the multiple projections 41a of the cap inner part 41 inside are integrally formed on the peripheral surface of the cap shell 42. Engaging claws 51 are cut out to rise from the bulging portions 50 and engaged with concavities 52 on the outer surface of the projections 41a, whereby the cap shell 42 is fixedly mounted to the cap inner part 41. The bulging portions 50 serve as slip stoppers when rotating the cap shell 42.

When the rotational direction of the cap shell 42 and the cap inner part 41 in screwing the cap body 40 into the fuel supply port cylinder 38 is denoted by A, and the rotational direction reverse to the rotational direction A is denoted by B, a ratchet mechanism 55 is interposed between the cap inner part 41 and the cap body 40 so as to be capable of transmitting the rotation of the cap inner part 41 in the direction A to the cap body 40 within a predetermined torque range and of transmitting the rotation of the cap inner part 41 in the direction B to the cap body 40 without slip.

Figure 10:
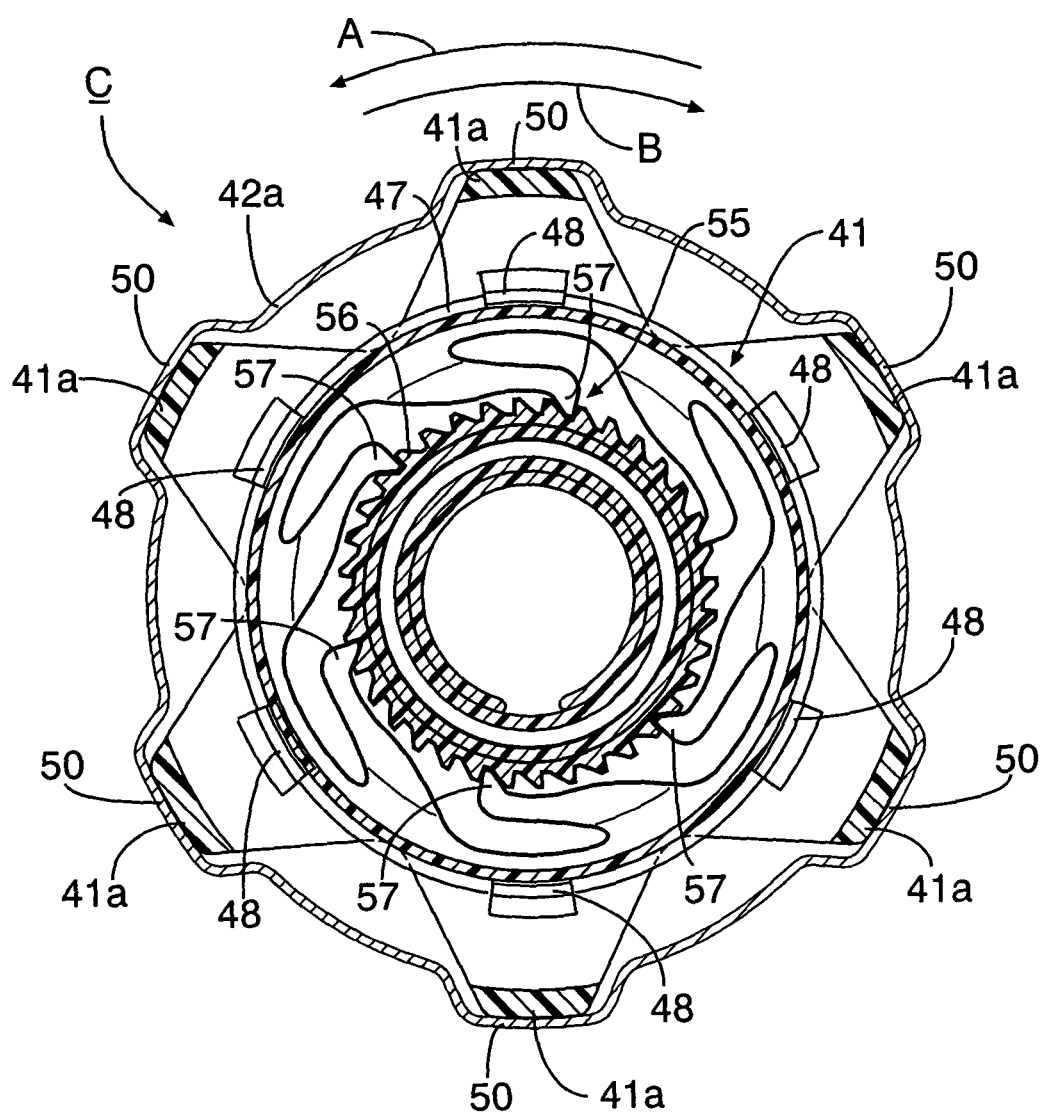
FIG. 10 is a sectional view taken on line 10-10 in FIG. 7. (first embodiment)

That is, as shown in FIG. 10, the ratchet mechanism 55 comprises: a ratchet gear 56 formed on the cap body 40 and disposed inside the connecting hook-shaped portion 47 concentrically therewith; and multiple ratchet pawls 57 integrally formed in the cap inner part 41 to be elastically engaged with the ratchet gear 56. When the cap shell 42 and the cap inner part 41 are rotated in the direction A, if the rotation torque exceeds a predetermined torque sufficient for appropriately bringing the gasket 43 into close contact with the sealing surface 39 of the fuel supply port cylinder 38, the ratchet pawls 57 slip from the ratchet gear 56. When the cap shell 42 and the cap inner part 41 are rotated in the opposite direction, i.e., in the direction B, no slip occurs between the ratchet pawls 57 and the ratchet gear 56, so that the cap inner part 41 and the cap body 40 integrally rotate.

As clearly shown in FIG. 8, the gasket 43 comprises: an annular lower lip 43a which comes into close contact with the sealing surface 39 of the fuel supply port cylinder 38; an annular upper lip 43b which comes into close contact with the lower surface of the flange 40b of the cap body 40 above the lower lip 43a; and a connection 43c which integrally connects inner peripheral end portions of the two lips 43a, 43b and is attached to the mounting groove 45 of the cap body 40. In this case, multiple elastic contact pieces 58 are integrally formed at the periphery of either of the two lips 43a, 43b, of the upper lip 43b in the present embodiment. The multiple elastic contact pieces 58 elastically come into contact with the inner peripheral surface of a peripheral wall 42a of the cap shell 42 except the bulging portions 50. Each of the elastic contact pieces 58 is inclined in a certain direction so as to slip smoothly on the inner peripheral surface of the cap shell 42 when a relative rotation occurs between the cap shell 42 and the cap body 40 due to the slip action of the ratchet mechanism 55. The multiple elastic contact pieces 58 and the bulging portions 50 are arranged at equal pitches around the axis of the tank cap C, but the numbers of the arranged elastic contact pieces 58 and the bulging portions 50 differ so as to arrange them at different pitches. As a result, in any relative rotational position of the cap shell 42 and the cap body 40, any of the multiple elastic contact pieces 58 is constantly in contact with the inner peripheral surface of the cap shell 42 except the multiple bulging portions 50.

The gasket 43 is molded from a conductive elastic material, for example, a material obtained by kneadingly incorporating vinyl chloride and carbon into natural rubber. In this case, it is preferred that the specific volume electric resistivity of the gasket 43 be set at $10^4$ to $10^{10} \Omega$.

The operation of the tank cap C having the above construction will be described below.

In a state in which the tank cap C is attached to the fuel supply port cylinder 38, the conductive cap body 40 is screwed into the fuel supply port cylinder 38 of the fuel tank T made of metal, the conductive gasket 43 attached to the cap body 40 is in close contact with the sealing surface 39 of the fuel supply port cylinder 38, and the elastic contact pieces 58 of the gasket 43 is in contact with the cap shell 42 made of metal. Therefore, the cap shell 42 is electrically grounded to the fuel tank T via the gasket 43. Thus, if an operator carrying static electricity grabs the cap shell 42 in order to refill the fuel tank T with fuel, the static electricity escapes to the fuel tank T through the gasket 43.

As described above, with a very simple construction in which the cap shell 42 is made of metal and the gasket 43 including the elastic contact pieces 58 in contact with the cap shell 42 is formed from a conductive material, it is possible to cause the static electricity carried by the operator to escape to the fuel tank. Further, because the elastic contact pieces 58 of the gasket 43 do not require a high dimensional accuracy, the production of the gasket 43 is easy. In addition, it is easy to form the threaded portion 44 in the cap body 40 made of synthetic resin, the production of the cap shell 42 made of metal is easy, and the cap shell 42 has a high impact resistance. Therefore, it is possible to provide a tank cap C having a high productivity and a high durability at low cost.

As described above, the cap body 40 and the cap shell 42 are connected so as to be mutually rotatable; at the same time the ratchet mechanism 55, which idles when a rotation torque in the direction A of tightening the cap shell 42 to the threaded portion 44 exceeds a predetermined value, is interposed between the cap shell 42 and the cap body 40; and the elastic contact pieces 58, which elastically come into sliding contact with the inner peripheral surface of the cylindrical peripheral wall 42a of the cap shell 42, are projectingly provided integrally on the periphery of the gasket 43. Therefore, during the screwing and tightening of the cap body 40 onto the fuel supply port cylinder 38, the idling of the ratchet mechanism 55 prevents the breakage of the threaded portion 44 and the gasket 43 due to an excessive tightening. Also during the idling of the ratchet mechanism 55, the elastic contact pieces 58 slide on the inner peripheral surface of the cap shell 42, thereby preventing an excessive deformation of the gasket 43 while keeping the state of contact between the cap shell 42 and the elastic contact pieces 58 of the gasket 43.

Further, the multiple bulging portions 50, serving as slip stoppers which bulge outward and are arranged at equal pitches, are formed on the cylindrical peripheral wall 42a of the cap shell 42, and the elastic contact pieces 58 of the gasket 43 are arranged in a plural number at pitches different from the pitches of the bulging portions 50, whereby at least one of the elastic contact pieces 58 is constantly in contact with the inner peripheral surface of the cylindrical peripheral wall 42a of the cap shell 42 except portions corresponding to the bulging portions 50. Therefore, although the multiple bulging portions 50, serving as slip stoppers which bulge outward and are arranged at equal pitches, are present on the cylindrical peripheral wall 42a of the cap shell 42, it is possible to always reliably maintain the state of contact between the elastic contact pieces 58 of the gasket 43 and the cap shell 42, thereby ensuring the state of grounding of the cap shell 42 to the fuel tank T, irrespective of the bulging portions 50 and the relative rotational positions of the cap shell 42 and the cap body 40.

Furthermore, the gasket 43 comprises the lower lip 43a which comes into close contact with the sealing surface 39 of the fuel supply port cylinder 38, the upper lip 43b which comes into close contact with the lower surface of the flange 40b of the cap body 40 above the lower lip 43a, and the connection 43c which integrally connects inner peripheral ends of the two lips 43a, 43b and is attached to the annular mounting groove 45 of the peripheral surface of the cap body 40; and the elastic contact pieces 58 are caused to project from the periphery of either of the two lips 43a, 43b. Therefore, the elastic contact pieces 58 having a high flexibility can be easily formed by using the upper lip 43b or the lower lip 43a of the gasket 43. Thus, the gasket 43 including the elastic contact pieces 58 can be obtained at low cost.

On the other hand, in the fuel tank T, the upper-half tank body 7 is made from a painted steel plate and the fuel supply port cylinder 38 made from an unpainted steel plate is connected to the upper-half tank body 7 by crimping so that the upper part of the fuel supply port cylinder 38 is exposed, and the surface of the exposed upper part of the fuel supply port cylinder 38 is formed to be the sealing surface 39. Therefore, the good appearance of the upper-half tank body 7 can be improved, and the sealing surface 39 of the fuel supply port cylinder 38 is maintained in good condition for a long term irrespective of an accidental exfoliation of the paint film on the surface of the upper-half tank body 7. In addition, because troublesome steps such as painting and masking are unnecessary after the connection of the fuel supply port cylinder 38 to the upper-half tank body 7, it is possible to improve productivity. Unlike the case of connection by welding, there is no need to concern about the burnout of the paint film on the surface of the upper-half tank body 7 and the thermal deformation of the sealing surface 39 of the fuel supply port cylinder 38, and it is possible to effectively increase the rigidity of the sealing surface 39 by virtue of the connection by crimping. Therefore, it is possible to maintain the good appearance of the upper-half tank body 7, and also improve the durability of the sealing surface 39.

Because the sealing surface 39 is formed into a funnel shape, if the fuel adheres to the sealing surface 39 during the supply of the fuel to the fuel tank T, it is possible to cause the fuel to naturally flow into the fuel tank T along the funnel-shaped sealing surface 39, thereby preventing the stain by the fuel on the top surface of the fuel tank T.

The fuel supply port cylinder 38 is made from a plated steel plate. Therefore, it is possible to connect the fuel supply port cylinder 38 to the upper-half tank body 7 by crimping without the exfoliation of the plating layer. At the same time, it is possible to improve the condition of the sealing surface 39 by the plating layer, and further improve the durability.

The present invention is not limited to the above-described embodiment and various design changes are possible without departing from the subject matter of the invention. For example, in the case where the fuel tank T has no bottom plate 9 covering the bottom surface of the lower-half tank body 8 and thus the lower-half tank body 8 is exposed to the outside, also the lower-half tank body 8 may be made from a painted steel plate in the same way as in the case of the upper-half tank body 7 in order to maintain the good appearance of the lower-half tank body 8.

The invention claimed is:

1. A fuel tank comprising an upper-half tank body and a lower-half tank body which are made from bowl-shaped steel plates and which integrally include an upper flange and a lower flange in their peripheral edges, respectively, the upper and lower flanges being superposed on and liquid-tightly connected to each other, wherein the upper and lower flanges and a support plate flange, which is formed in a peripheral edge portion of a bowl-shaped bottom supporting plate arranged to cover a bottom surface of the lower-half tank body, are connected together by crimping into a roll shape to form an annular thick-walled connection in which an end portion of the upper flange laterally abuts and directly contacts an end portion of the lower flange and an end portion of the support plate flange, and the lower flange laterally abuts and directly contacts the end portion of the support plate flange;

wherein annular reinforcing ribs leading to opposite sides of the connection are formed in the upper-half and lower-half tank bodies;

wherein the steel plate of at least the upper-half tank body is a colored steel plate having an outwardly exposed surface;

wherein the annular thick-walled connection is formed such that tip edges of the end portions of the upper flange, the lower flange, and the support plate flange are not exposed to an outside of the connection; and wherein each of the annular reinforcing ribs is defined by an annular step rising from an outer surface of each of the upper-half tank body and the lower-half tank body.

2. A fuel tank comprising an upper-half tank body and a lower-half tank body which are made of bowl-shaped steel plates and which integrally include an upper flange and a lower flange in their peripheral edges, respectively, the upper and lower flanges being superposed on and liquid-tightly connected to each other, wherein the upper and lower flanges and a support plate flange, which is formed in a peripheral edge portion of a bowl-shaped bottom supporting plate arranged to cover a bottom surface of the lower-half tank body, are connected together by crimping into a roll shape to form an annular thick-walled connection in which an end portion of the upper flange laterally abuts and directly contacts an end portion of the lower flange and an end portion of the support plate flange, and the lower flange laterally abuts and directly contacts the end portion of the support plate flange;

wherein mutually opposed surfaces of the upper and lower flanges at the annular thick-walled connection are bonded together by adhesive applied thereto while mutually opposed surfaces of the upper flange and the support plate flange, which form an outwardly exposed area of the annular thick-walled connection, are free of adhesive;

annular reinforcing ribs leading to the connection are formed in the upper-half tank body, the lower-half tank body, and the bottom supporting plate; and the bottom supporting plate is provided with a mounting portion for mounting the bottom supporting plate to an engine;

wherein the upper-half tank body and the bottom supporting plate are each formed of a steel plate which has an outwardly exposed surface prebaked with a paint film thereon such that the paint films prebaked on the upper-half tank body and the bottom supporting plate are in a direct contact with each other at the connection.

3. The fuel tank according to claim 2, further comprising:

a fuel storage chamber being defined between the upper-half tank body and the lower-half tank body;

a fuel supply port cylinder which is connected to the upper-half tank body so as to pass therethrough and which is closed by a tank cap;

an annular sealing surface being formed on an upper end surface of the fuel supply port cylinder, and a gasket of the tank cap coming into close contact with the annular sealing surface, wherein the sealing surface is formed into a funnel shape having a radially inner side being inclined downwardly relative to a radially outer side; and the fuel supply port cylinder made of an unpainted, plated steel plate is connected by crimping to the upper-half tank body such that an upper part of the fuel supply port cylinder is exposed above the upper-half tank body and an outwardly exposed surface at the upper part of the fuel supply port cylinder is used as said annular sealing surface.

4. The fuel tank according to claim 2, wherein each of the annular reinforcing ribs is defined by an annular step rising from an outer surface of each of the upper-half tank body, the lower-half tank body and the bottom supporting plate.

* * * * *